United States Patent [19]

Christian et al.

[11] 3,992,147

[45] Nov. 16, 1976

[54] PROCESS FOR STERILIZING PSYLLIUM SEED HUSK USING AQUEOUS ISOPROPANOL

[75] Inventors: John W. Christian, Phoenix, Ariz.; Jerry J. Renbarger, Park Ridge, Ill.

[73] Assignee: G. D. Searle & Co., Chicago, Ill.

[22] Filed: Nov. 14, 1975

[21] Appl. No.: 631,979

Related U.S. Application Data

[63] Continuation-in-part of Ser. No. 516,603, Oct. 21, 1974, abandoned.

[52] U.S. Cl. .......................................... 21/58; 21/2; 424/130; 424/343; 426/335; 426/430; 426/331
[51] Int. Cl.$^2$ ..................... A61L 13/00; A23B 9/00
[58] Field of Search ............ 21/58, 2; 426/335, 331, 426/429–431; 424/130, 331, 343; 260/209 R

[56] References Cited

UNITED STATES PATENTS

| | | | |
|---|---|---|---|
| 650,933 | 6/1900 | Fournier | 424/331 |
| 1,927,988 | 9/1933 | Muller | 424/130 |
| 2,010,880 | 8/1935 | Near et al. | 260/209 R |
| 2,622,982 | 12/1952 | Stevens | 426/429 |
| 2,832,664 | 4/1958 | Bloch | 21/58 |
| 3,533,806 | 10/1970 | Papworth et al. | 21/58 |

OTHER PUBLICATIONS

Hawley; Gessner, The Condensed Chemical Dictionary, 8th Ed., Van Nostrand Reinhold Co., N.Y., N.Y., 1971, pp. 455, 456 & 486.

Reddish, George, Antiseptics, Disinfectants, Fungicides, and Chemical & Physical Sterilization, 2nd Ed., Lea & Febiger, Philadelphia, 1957, pp. 380–383 & 442–445.

*Primary Examiner*—Norman Yudkoff
*Assistant Examiner*—Dale Lovercheck
*Attorney, Agent, or Firm*—John J. McDonnell

[57] ABSTRACT

The present invention is concerned with a method for sterilizing psyllium seed husk without substantial swelling of the psyllium seed husk comprising contacting for 5 minutes or more said psyllium seed husk with a 15°–50° C solution of 0.2–10% by weight hydrogen peroxide in a solvent having 2–50 parts by volume water and 50–98 parts by volume isopropanol.

2 Claims, No Drawings

PROCESS FOR STERILIZING PSYLLIUM SEED HUSK USING AQUEOUS ISOPROPANOL

This is a continuation-in-part of Ser. No. 516,603, filed Oct. 21, 1974, now abandoned.

The present invention is concerned with a method for sterilizing psyllium seed husk without substantial swelling of the psyllium seed husk comprising contacting for 5 minutes or more said psyllium seed husk with a 15°–50° C solution of 0.2–10% by weight hydrogen peroxide in a solvent having 2–50 parts by volume water and 50–98 parts by volume isopropanol. A preferred embodiment of the present invention is a method for sterilizing psyllium seed husk comprising contacting for 5 minutes or more psyllium seed husk with a 15°–50° C solution containing 0.5–10% by weight hydrogen peroxide in a solvent having about 2–20 parts by weight water and about 80–98 parts by weight isopropanol.

The most preferred embodiment of the present invention involves soaking psyllium seed husk in a 15% water/85% isopropanol solution containing 2% hydrogen peroxide at 40° C for 30 minutes. The husks are then filtered and dried. Untreated psyllium seed husks have a bacterial count of about 1 million counts/gram. After treatment according to the process of the present invention the bacterial count is reduced to zero. The bacteria are counted by the MPN (Most Probable Number) method described in United States Pharmacopia XVIII at page 849.

The term psyllium seed is used in the generic sense to refer to seeds of the Plantagi genus and this term is recognized (Roy L. Whistler and James N. BeMiller, *Industrial Gums*, Academic Press, New York and London(1959) p. 438) to include seeds of species such as *Plantago psyllium, Plantago ovata, Plantago indica, Plantago lanseolato*, and *Plantago major* as representative but not exclusive examples.

Generally, psyllium seed husk is separated by the application of pressure to the whole seed; the husk is separated, sterilized, and then incorporated into laxative products with or without further processing.

This invention is conveniently practiced by preparing a solution of about 60 parts by volume of water to 440 parts by volume of isopropanol and 30 parts by volume of 30% hydrogen peroxide. 100 Parts of psyllium husk is added to this solution and stirred for about 30 minutes. The husks are filtered and the solvent is evaporated. These sterilized husks can be incorporated into a variety of commercial laxative products such as those set out on page 1399, *Modern Drug Encyclopedia and Therapeutic Guide*, 2nd Edition, edited by Dr. Jacob Gutman.

Other methods of sterilizing psyllium husk are known. Treatment with ethylene oxide provides effective sterilization, but results in undesirable residues such as ethylene chlorohydrin and ethylene glycol.

Chlorination is likewise an effective method of sterilizing psyllium seed husk, but chlorination produces an undesirable taste and alters swelling characteristics of the psyllium seed husk material.

It is well known that psyllium seed husk possesses the properties of absorbing large quantities of water, swelling, and exuding a mucilaginous or mucinous substance having physical properties of a clear, sticky jelly. It is further known that this substance provides bulk and acts to stimulate peristalsis in humans and further serves as a non-absorbable lubricant which prevents irritation and promotes the free passage of fecal matter. Sterilization of psyllium seed husk in aqueous hydrogen peroxide leads to extensive swelling up to 5–6 times the original volume and this swelling renders the material very difficult to handle and process. Sterilization in methanol, ethanol, acetone in combination with water also causes extensive swelling and loss of handling facility. Table I illustrates the superiority of isopropanol solution in regard to swelling characteristics during sterilization.

TABLE I

| Sample in 178 Aqueous isopropylalcohol | Vol. of swelled muciloid measured in cc | | | |
|---|---|---|---|---|
| | 10 min. | 1 hour | 24 hour | 48 hour |
| isopropylalcohol | 3 cc | 3 cc | 3 cc | 3 cc |
| 30% | 5 cc | 5½ cc | 5½ cc | 5½ cc |
| 40% | 7 cc | 7½ cc | 7½ cc | 7½ cc |
| 50% | 9 cc | 10 cc | 10 cc | 13½ cc |
| Water | 60 cc | 80 cc | 80 cc | 65 cc |

DATA:

| Sample in % Aq. MeOH | Vol. of swelled muciloid measured in cc | | | |
|---|---|---|---|---|
| | 10 Min. | 1 Hr. | 24 Hr. | 48 Hr. |
| MeOH | 4.5 | 5.0 | 7.0 | 7.0 |
| 30% | 8.0 | 9.5 | 10.0 | 10.0 |
| 40% | 10.0 | 12.0 | 14.0 | 14.0 |
| 50% | 14.0 | 24.0 | 27.0 | 27.0 |

| Sample in % Aq. EtOH | Vol. of swelled muciloid measured in cc | | | |
|---|---|---|---|---|
| | 10 Min. | 1 Hr. | 24 Hr. | 48 Hr. |
| EtOH | 5.0 | 5.0 | 5.0 | 5.0 |
| 30% | 9.0 | 10.0 | 10.5 | 10.5 |
| 40% | 11.0 | 13.0 | 16.0 | 16.0 |
| 50% | 13.0 | 15.0 | 25.0 | 25.0 |

| Sample in % Aq. Acetone | Vol. of swelled muciloid measured in cc | | | |
|---|---|---|---|---|
| | 10 Min. | 1 Hr. | 24 Hr. | 48 Hr. |
| Acetone | 4.5 | 4.5 | 5.0 | 5.0 |
| 30% | 8.5 | 10.0 | 10.0 | 10.0 |
| 40% | 10.0 | 11.0 | 11.0 | 11.0 |
| 50% | 13.0 | 15.0 | 21.0 | 21.0 |

| Sample in % Aq. methylethylketone | Vol. of swelled muciloid measured in cc | | | |
|---|---|---|---|---|
| | 10 Min. | 1 Hr. | 24 Hr. | 48 Hr. |
| methylethylketone | 5.0 | 5.0 | 5.0 | 5.0 |
| 30% | 19.0 | 21.0 | 34.0 | 34.0 |
| 40% | 20.0 | 21.5 | 34.0 | 34.0 |
| 50% | 20.0 | 22.5 | 39.0 | 39.0 |

The swell testing was done by placing 1 gram of muciloid husks in a 100 cc graduated cylinder and filling to the 100cc level with premixed aqueous solvent. The slurry is stirred occasionally and measured at 10 minutes, 1 hour, 24 and 48 hour intervals. The samples were compared with 1 gram samples in 100% solvent and 100% water.

Hydrogen peroxide in aqueous isopropanol is known as a sterilizing media. The unexpected and advantageous reduced swelling characteristics of this solution when used to sterilize psyllium seed husk in the present invention provides a novel solution to a swelling problem in the manufacture of laxatives from psyllium seed husk.

The invention will appear more fully from the example which follows. This example is given by way of illustration only and is not to be construed as limiting the invention either in spirit or in scope, as many modifications both in materials and methods will be apparent to those skilled in the art. In this example, temperatures are given in degrees Centigrade (° C) and quantities of materials are expressed in parts by weight unless otherwise specified. The relationship between parts by weight and parts by volume is the same as that existing between grams and milliliters.

EXAMPLE 1

A solution of 440 parts by volume of isopropanol, 60 parts by volume of water, and 30 parts by volume of 30% hydrogen peroxide is heated to 40° C and 100 parts of psyllium seed husk is added. This mixture is stirred for 30 minutes and the husks are isolated by filtration and dried.

What is claimed is:
1. A method for sterilizing psyllium seed husk without substantial swelling of the psyllium seed husk comprising contacting for 5 minutes or more said psyllium seed husk with a 15°–50° C solution of 0.2–10% by weight hydrogen peroxide in a solvent having 2–50 parts by volume water and 50–98 parts by volume isopropanol.

2. A process for sterilizing psyllium seed husk as in claim 1, comprising contacting for 5 minutes or more said psyllium seed husk with a 15°–50° C solution containing 0.5–10% hydrogen peroxide in a solvent having about 2–20 parts by weight water and about 80–98 parts by weight isopropanol.

* * * * *